(12) United States Patent
Gould et al.

(10) Patent No.: US 9,104,527 B2
(45) Date of Patent: Aug. 11, 2015

(54) AUTOMATICALLY GENERATED STYLE RULES FOR PAGE DESIGN

(75) Inventors: Sayuri Wijaya Gould, Seattle, WA (US); Ryan J. Salva, Seattle, WA (US); Heather T. Brown, Redmond, WA (US); Erik A. Saltwell, Seattle, WA (US); Christian Schormann, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 13/228,390

(22) Filed: Sep. 8, 2011

(65) Prior Publication Data

US 2013/0067322 A1    Mar. 14, 2013

(51) Int. Cl.
*G06F 17/22* (2006.01)
*G06F 17/00* (2006.01)
*G06F 17/27* (2006.01)

(52) U.S. Cl.
CPC ............. *G06F 17/00* (2013.01); *G06F 17/227* (2013.01)

(58) Field of Classification Search
CPC ..... G06F 17/227; G06F 17/00; G06F 17/211; G06F 17/218
USPC .................. 715/230, 231, 234–237, 705, 708
See application file for complete search history.

(56) References Cited

U.S. PATENT DOCUMENTS

| | | | |
|---|---|---|---|
| 5,860,073 A | 1/1999 | Ferrel et al. | |
| 7,117,429 B2 | 10/2006 | Vedullapalli et al. | |
| 7,191,397 B2 * | 3/2007 | Brooke et al. | 715/239 |
| 7,562,070 B2 * | 7/2009 | Tchaitchian et al. | 1/1 |
| 7,877,465 B2 | 1/2011 | Kontamsetty et al. | |
| 7,941,746 B2 | 5/2011 | Kelkar et al. | |
| 2004/0186817 A1 * | 9/2004 | Thames et al. | 707/1 |
| 2004/0205605 A1 * | 10/2004 | Adler et al. | 715/517 |
| 2005/0132284 A1 * | 6/2005 | Lloyd et al. | 715/517 |
| 2007/0061710 A1 | 3/2007 | Chartier et al. | |
| 2008/0126983 A1 * | 5/2008 | Keohane et al. | 715/810 |
| 2009/0031211 A1 | 1/2009 | Yao et al. | |
| 2011/0173555 A1 * | 7/2011 | Miyoshi | 715/770 |

OTHER PUBLICATIONS

Greg J. Badros et. al., "Constraint Cascading Style Sheets for the Web", May 7, 1999, UIST '99 Proceedings of the 12th annual ACM symposium on User interface software and technology, (10 pages).
Christoph Wieser, CSSNG: An Extension of the Cascading Styles Sheets Language (CSS) with Dynamic Document Rendering Features, Apr. 30, 2006, Diploma thesis, Institute for Informatics, LMU, Munich, 2006 (163 pages).

* cited by examiner

*Primary Examiner* — Wilson Tsui
(74) *Attorney, Agent, or Firm* — Kevin Sullivan; Aaron Hoff; Micky Minhas (57) ABSTRACT

The automated derivation of style rules based on authored style rules. Style rules are used to apply styles to certain elements of a markup language document. Authored style rules are style rules that are created by a designer. However, the derived style rules are automatically created by evaluating an authored style rule set. Then authored style rules are displayed with derived style rules. The user interface in which the combined style rules appear may also provide interactivity such that at least one of the properties of a derived style rule is bound to a property of an authored style rule from which the property of the derived style rule was derived. In some embodiments, the derived style rules may be style rules that are helpful to the design of a document, but are not interpreted after the document is deployed.

20 Claims, 4 Drawing Sheets

AUTOMATICALLY GENERATED STYLE RULES FOR PAGE DESIGN

BACKGROUND

Style rules are used to apply a style to elements of a markup language document or a collection of markup language documents. Style rules typically are composed of a selector and a set of one or more property name/value pairs. The selector is used to select which of the elements of the corresponding document(s) that the style rule applies to, and the property name/value pairs set the appropriate property values for the selected elements.

Style sheets define a collection of one or more style rules. For instance, Cascading Style Sheets (CSS) may be used to apply one or more style rules to HyperText Markup Language (HTML) documents. However, style may originate from other sources as well. For instance, styles may be applied by default by the browser, styles may be inherited values which the element inherits from a parent or ancestor element, or styles that are applied at runtime via some executable (such as Javascript) which alters the style attribute of the element. Thus, there is potentially a variety of potential style sources that may apply to any given property of a given element. In the case of multiple conflicting styles, there is a set of conflict resolution rules which governs which style will be applied.

BRIEF SUMMARY

At least one embodiment described herein relates to the automated derivation of style rules based on authored style rules. Style rules are used to apply styles to certain elements of a markup language document. Authored style rules are style rules that are created by a designer. However, the derived style rules are created by evaluating an authored style rule set of one or more authored style rules. Then authored style rules are displayed with derived style rules. In some embodiments, the user interface in which the combined style rules appear also provides interactivity with the displayed style rules such that at least one of the properties of a derived style rule is bound to a property of an authored style rule from which the property of the derived style rule was derived. In some embodiments, the derived style rules may be style rules that are helpful to the design of a document, but are not interpreted, are ignored, or are simply not present, when the document is actually rendered after the document is deployed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, style rules are derived from authored style rules. Style rules are used to apply styles to certain elements of a markup language document. Authored style rules are authored by a designer. However, the derived style rules are automatically generated based on an evaluation of the authored style rules. The authored style rules are displayed with the derived style rules. The user interface in which the combined style rules appear may also provide interactivity such that at least one of the properties of a derived style rule is bound to a property of an authored style rule from which the property of the derived style rule was derived. In some embodiments, the derived style rules may be style rules that are helpful to the design of a document, but are not interpreted, are ignored, or are not present after the document is deployed. First, some introductory discussion regarding computing systems will be described with respect to FIG. 1. Then, the embodiments of the automatically created derived style rules and its operation will be described with respect to FIGS. 2 through 5.

Figure 1:
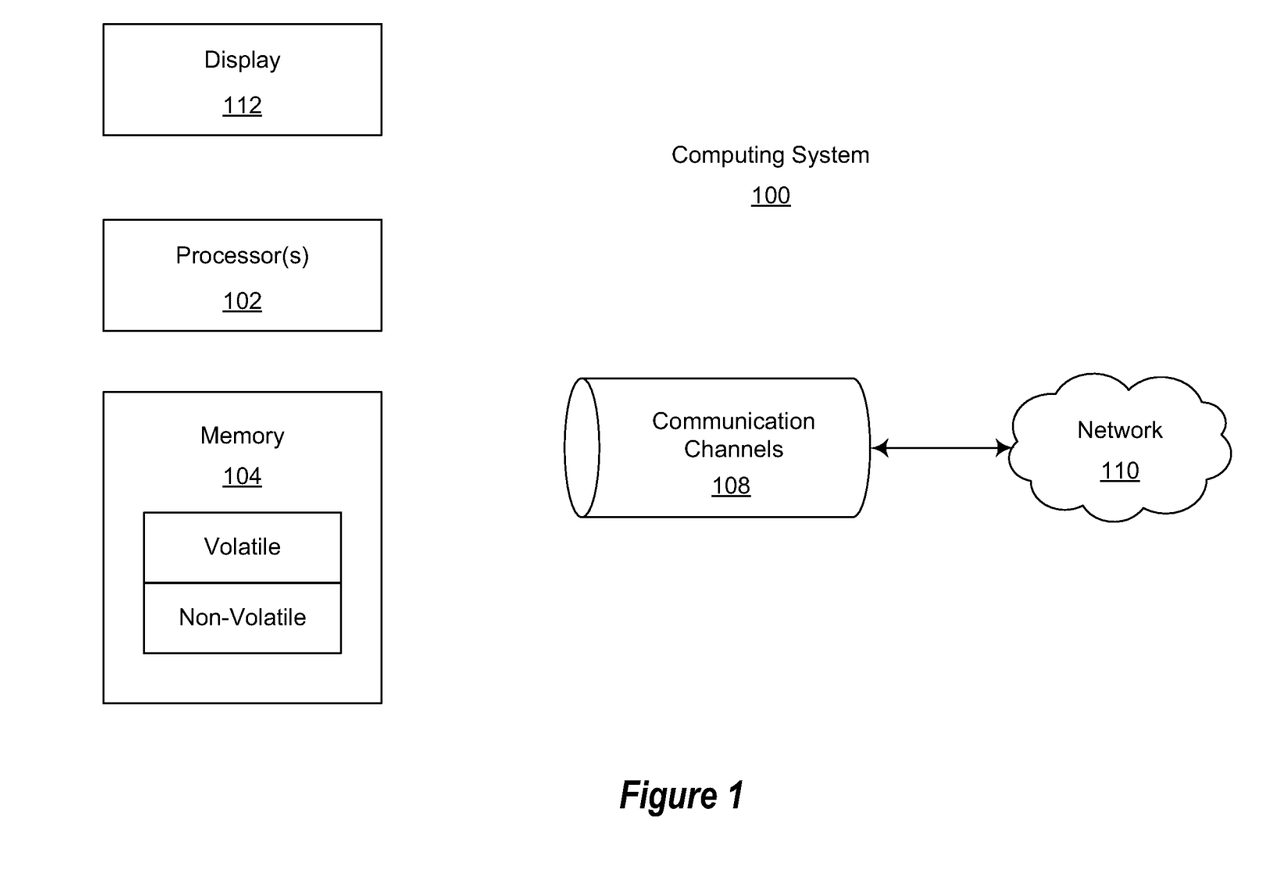
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
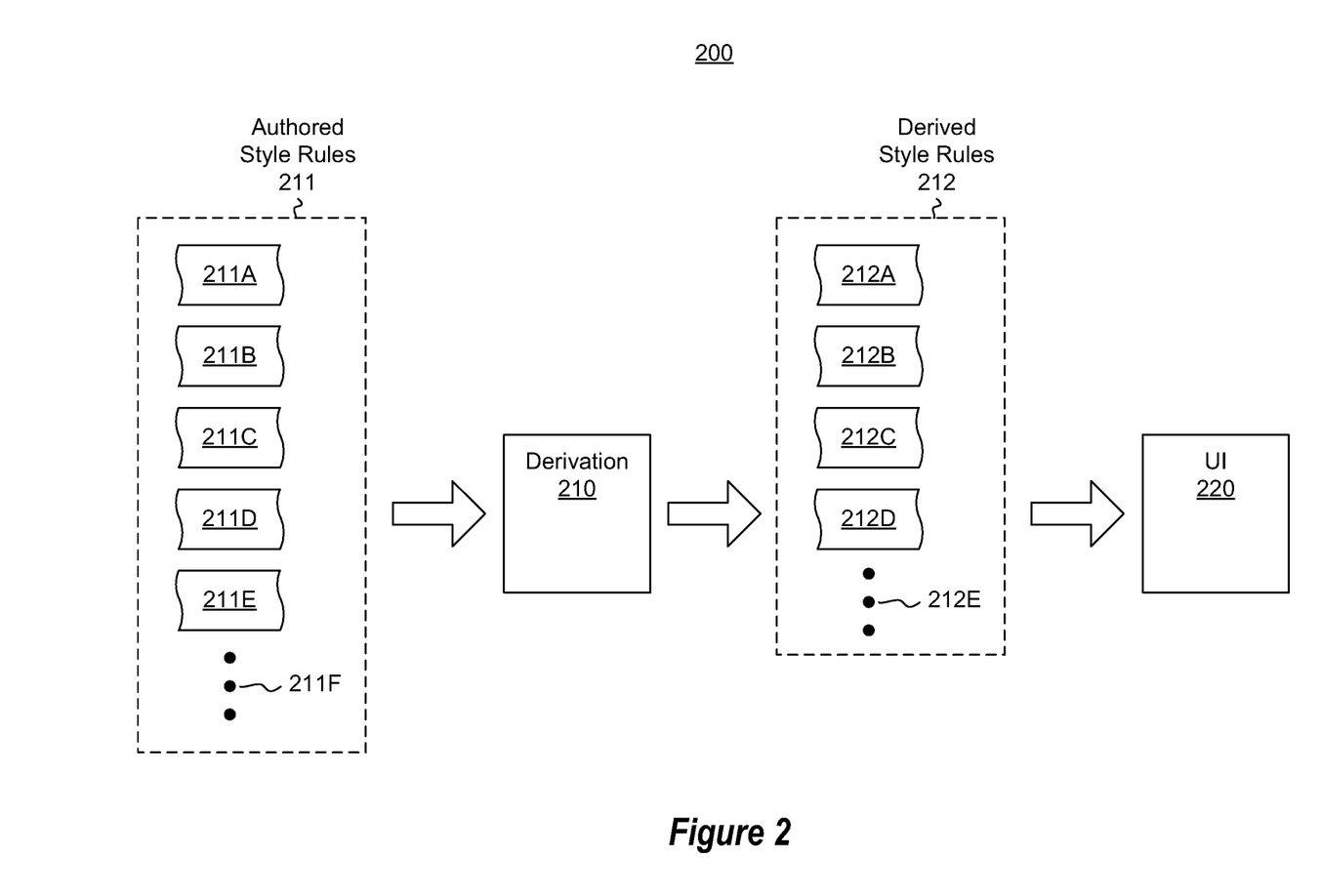
FIG. 2 illustrates an environment in which the principles described herein may operate, in which an authored style rule set is evaluated and from that evaluation a derived style rule set is generated, with a user interface component rendering both authored and derived style rule.

FIG. 2 illustrates an environment 200 in which the principles described herein may operate. The environment includes a derivation component 210 and a user interface component 220. If implemented in software, such components may be instantiated in memory (e.g., in memory 104) in response to the execution of computer-executable instructions, by one or more processors (e.g., processor(s) 102) of the computing system (e.g., computing system 100). The derivation component 210 and the user interface component 220 may each be multiple components.

The derivation component 210 is configured to evaluate an authored style rule set. For instance, in FIG. 2, the authored style rule set 211 is illustrated as including five style rules 211A through 211E, though the vertical ellipses 211F represent general flexibility in the number of authored style rules that are evaluated by the derivation component 210. There may be as few as one style rule evaluated, with no upper limit on the number of authored style rules.

Authored style rules sets are style rule sets that include one or more authored style rules. Authored style rules are style rules that are authored by a designer. The style rules are associated with one or more markup language documents. An example of a markup language document is a HyperText Markup Language (HTML) document. Cascading Style Sheet (CSS) documents are one location in which an author may generate style rules, especially for application to an HTML document. There are a variety of design tools available which provide an intuitive interface for allowing a designer to style a markup language document, which in turn causes the generation of authored style rules.

Figure 3:
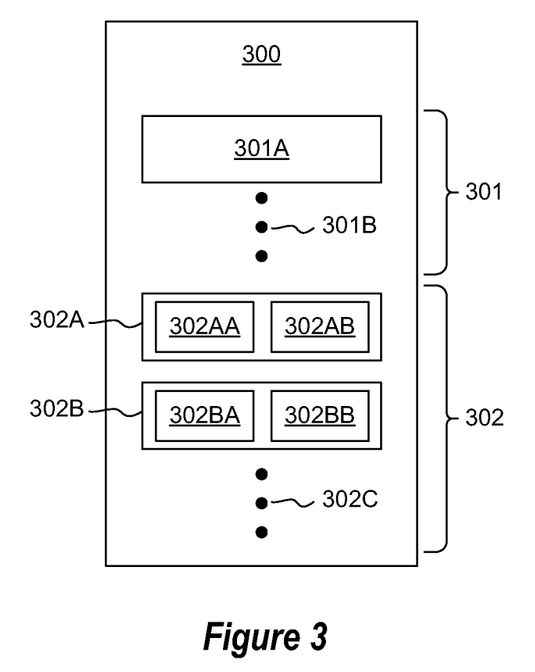
FIG. 3 abstractly illustrates the content of a style rule as including one or more selectors and one or more property name/value pairs.

FIG. 3 illustrates a structure of a style rule 300. Each style rule includes one or more selectors 301. For instance, the style rule 300 includes selector 301A as well as potentially other selectors as represented by the vertical ellipses 301B. The selector identifies a class of element that the style rule is to be applied to in any of the associated markup language document(s). The style rule also includes one or more property name/value pairs 302. In the illustrated example of FIG. 3, the style rule 300 includes two property name/value pairs 302A and 302B, although the vertical ellipses 302C generally represent flexibility in the number of property name/value pairs that are included in a style rule. Each property name/value pair includes an associated property name and property value. For instance, name/value pair 302A includes a property name 302AA and a property value 302AB. Name/value pair 302B includes a property name 302BA and a property value 302BB. For any markup language document that is associated with the style rule, for any corresponding element selected by the selector(s) 301, the associated property or properties of that element will be set as described by each property name/pair or pairs in the style rule.

Figure 5:
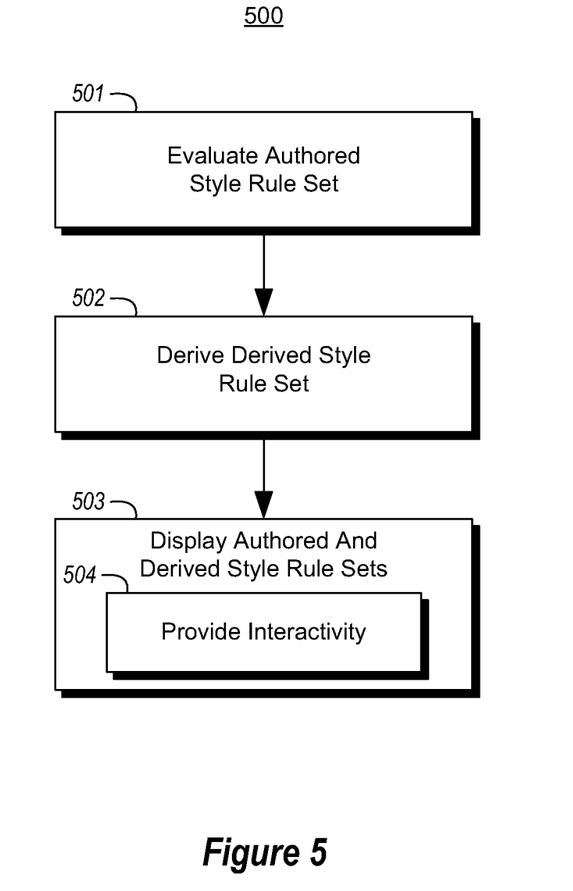
FIG. 5 illustrates a flowchart of computer-implemented method for displaying a hybrid set of one or more authored style rules as well as one or more derived style rules on a display.

FIG. 5 illustrates a flowchart of computer-implemented method 500 for displaying a hybrid set of one or more authored style rules as well as one or more derived style rules on a display. The method 500 may be performed by a computing system (such as computing system 100 of FIG. 1) in order to cause the processing described with respect to FIG. 2. Accordingly, the method 500 of FIG. 5 will be frequently referred to when describing the processing of the environment 200 of FIG. 2. The method 500 includes an act of evaluating an authored style rule set (act 501) of one or more authored style rules that apply to a set of one or more markup language element types. For instance, as just described, the derivation component 210 of FIG. 2 evaluates the authored style rule set 211.

Based on the evaluation of the authored style rule set, the derivation component 210 derives a derived style rule set 212 (reference act 502 of FIG. 5). In the example of FIG. 2, derived style rules set 212 is illustrated as including four derived style rules 212A through 212D. However, again the vertical ellipses 212E represents flexibility in the number of derived style rules that may be generated based on the evaluation. There may be as few as one derived style rule in the derived style rule set, with no upper limit on the number of derived style rules in the derived style rule set.

Derived style rules are style rules that are not authored by a designer, but rather are automatically generated based on the evaluation of authored style rules. In contrast, authored style rules are generated by having the author expressly reference what property values are to be applied to which element types. Authored style rules are interpretable by a browser to thereby cause styling to be applied to the corresponding markup language document(s). In contrast, in one embodiment, the derived style rules are not interpretable by a browser, are ignored by the browser, or perhaps are not even present after the design phase. Rather, the derived style rules are simply to provide some intuition to the designer during the design phase during which the markup language document(s) are being styled. Thus, while there is no limit to the information that the derived style rules may convey, the derived style rules are especially useful if they express information that is helpful during the design process. The derived style rules may even be perhaps deleted, or otherwise rendered invalid, so that they are not interpreted by the browser, once the corresponding markup language documents are deployed when users can actually use a browser to navigate to at least one of the corresponding markup language documents.

Specific examples of derived style rules that could be helpful in the design process will now be described. This is just a very short listing of example derived style rule category, and is by no means limiting of the broader scope of the principles described herein. Nevertheless, five examples of derived style rule categories that would be useful during the design will now be described.

A first example derived style rule category is an inherited property style rule category. This would include properties that are inherited by a selected element by virtue of that element's context within the markup language document. The settings of the inherited properties are inherited by the selected element in the absence of any expressed settings for that property. For instance, an expressed setting for that property might occur if there is an authored style rule that indicates that a class to which the selected element belongs is to have the property set to a particular expressed value. It is helpful for a designer to know which properties are or could be inherited by a particular element.

A second example derived style rule category is a winning property style rule category. This would include properties that are actually applied to the element after the application of the style rule conflict resolution rules that are be applied during rendering of the markup language document. This is helpful so that the designer understands the actual settings of the property for the element.

A third example derived style rule category is a code style rules category that includes properties that are set by executing code (such as script). For instance, sometimes Javascript code may be used to set property values. Since such settings override all other conflict resolution rules, it is helpful for a designer to know that further style rules will not cause a change in the property setting. Rather, the code itself should be removed or altered to cause any desired change in setting to that property.

A fourth example derived style rule category is an incompatible style rule category that lists style rules that are incompatible with a particular product (e.g., a particular browser). This helps the designer understand that some change in the style rule should be made if compatibility with that product is desired.

A fifth example derived style rule category a calculated style rule category that have property values that are related to an authored style rule property value through a function. For instance, whereas an authored style rule may provide a font size property in terms of inches, a calculated style rule may instead provide the font size in terms of pixels. The calculation would receive as input 1) the font size, and 2) the display resolution, to calculate the pixel size of the font.

Referring back to FIG. 2, a user interface component 220 concurrently displays at least one of the authored style rules of the authored style rule set along with at least one of the derived style rules of the derived style rule set. Referring to FIG. 5, for example, the method includes an act of displaying at least one of the authored style rules of the authored style rule set along with at least one of the derived style rules of the derived style rule set (act 503).

Figure 4:
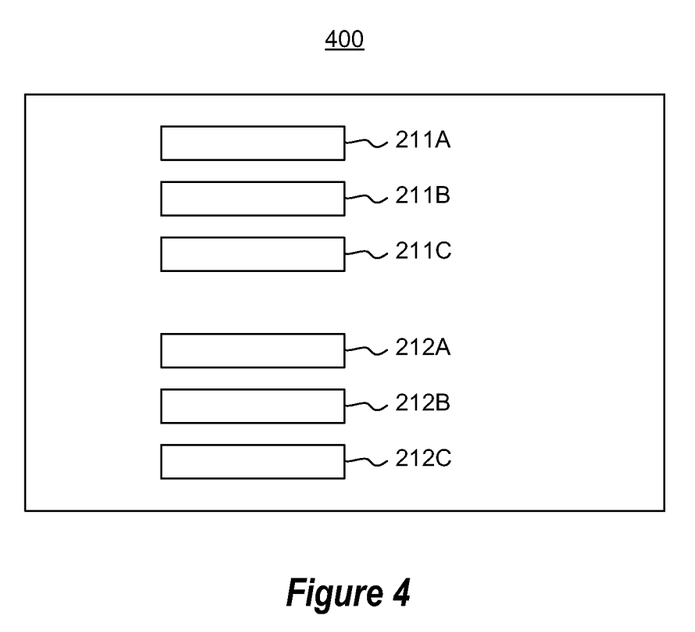
FIG. 4 abstractly illustrates a user interface in which authored style rules and derived style rules both appear.

FIG. 4 abstractly illustrates a user interface 400 that includes authored style rules 211A through 211C and derived style rules 212A through 212C. This user interface 400 may have been created, for example, by the user interface component 220 of FIG. 2 performing the act 503 of FIG. 5. Although only a subset (e.g., authored style rules 211A through 211C) of the analyzed authored style rules (e.g., authored style rules 211A through 211E) are displayed in FIG. 4, all of the authored style rules of the style rule set may be alternatively displayed. On the opposite extreme, as few as one of the authored style rules of the authored style rule set may be displayed. Furthermore, although only a subset (e.g., derived style rules 212A through 212C) of the derived style rules (e.g., derived style rules 212A through 212D) are displayed in FIG. 4, all of the derived style rules of the derived style rule set may be alternatively displayed. On the opposite extreme, as few as one of the derived style rules of the derived style rule set may be displayed.

Referring again to FIG. 2, the user interface component 220 may optionally also provide interactivity with the displayed style rules. Referring to FIG. 5, for example, the method 500 may include an act of providing interactivity (act 504) with the displayed style rules. For instance, referring to FIG. 4, some or all of the displayed style rules 211A through 211C and 212A through 212C may have some interactivity functions applied to them. This act 504 is illustrated as being included within the displaying act 503, since the display includes the actual controls for interactivity. More regarding types of interactivity that might be useful in the design process will be described following a walkthrough example that will now be provided with respect to specific authored and derived style rules.

There will be two alternatives of this walkthrough example. In the first alternative, there are two different derived style rule types including 1) an inherited style rules type and 2) a winning style rules type. In the second alternative, these same two derived style rule types are included, but are supplemented with 3) a code derived style rule type. The first alternative walkthrough will now be described in detail.

In this first alternative walkthrough, there is a class called Buttons. There is also a class called InterestingButtons, which is a subclass of the Buttons class such that a markup language document element that is of class InterestingButton is also of class Button.

The designer selects an element in a markup language document that happens to be of the class InterestingButtons, and thus is also of class Button. An applied style rules list then appears. Applied style lists are known in the art, but conventionally, they only list authored style rules.

For instance, suppose that an author has expressed the following style rule to be applied to all elements of the type InterestingButtons.

InterestingButton This is the Selector
Font=Times New Roman This is a first property name/value pair

This is an authored style rule set, and thus an author has expressly indicated that for any element of the class InterestingButton in any of the corresponding markup language document(s) to which this style rule applies, the font should be Times New Roman. Note that in this example, text that has double asterisks ** on each side are comments only, and may not be part of the style rule itself.

Now suppose that there is another authored style rule that applies to the class Button. The author may have specified a style rule that is as follows:

Button This is the Selector
Font=Arial This is a first property name/value pair

Here the author has specified that for any elements of the class Button, the font is to be Arial.

In this case, the applied style list might conventionally list the following authored style rules:
InterestingButton
Font=Times New Roman
Button
Font=Arial However, in accordance with the principles described herein, derived style rule sets may be derived or generated based on an evaluation of authored style rule sets.

For instance, consider as an example the derivation of an inherited property style rule. Such a derivation may be accomplished by evaluating an authored style rule set. For instance, suppose the designer selected an element of the class InterestingButton from a particular paragraph. The element inherits properties from the paragraph based on the position of the selected InterestingButton element within the paragraph. Now suppose that an author has authored the following style rule for the paragraph.

Paragraph The Selector
Font: Helvetica This is a first property name/value pair
FontSize: 12 point This is a second property name/value pair

These properties are inherited by any element within the paragraph. Thus, in order to derive an inherited property set, the derivation reviewed the properties of any parent element within the corresponding markup language document, and identified those properties as being inherited. Thus, the derivation may result in the following derived style rule to be displayed when the InterestingButton element is selected within the context of the paragraph.

InheritedProperties
Font: Helvetica This is a first property name/value pair
FontSize: 12 point This is a second property name/value pair

Note that these style rules were not expressly authored by the author. Instead, they are derived from an analysis of other style rules (e.g., the paragraph style rule) that were authored by the authored.

Consider now as another example the derivation of a winning style rule. Such a derivation may be accomplished by evaluating style rule conflict resolution rules. For instance, the conflict resolution rules may be as follows:

1) Style rules that are set by code prevail over all other conflicting style rules.
2) If an element is a member of multiple classes for which there is a conflicting style rule, the style rule for the more specific class prevails.
3) If an element inherits a style rule based on position within the document, the inherited style rule for a property prevails only if there is no authored style rule for that property.

In this example, the conflict resolution rules are applied to identify the winning style rule set. In this first alternative walkthrough, there are no style rules that are set by code. Rather, they have been style rules that have just been authored. Accordingly, conflict resolution rule #1 has no application at this point.

As for the property with name "Font", there is a style rule for that property that applies to the InterestingButton class (e.g., Font=Times New Roman). However, there is also a style rule for that property that applies to the Button class (e.g., Font=Arial). The selected element belongs to both classes. However, in accordance with conflict resolution rule #2, it is the setting for the InterestingButton class that prevails, since that class is more specific. Because there is an authored style rule for the Font property, conflict resolution rule #3 has no influence, and thus the inherited Font property setting (e.g. Font=Helvetica) has no application. Thus, the winning Font property setting is set at the InterestingButton style rule (e.g., Font=Times New Roman).

As for the property with name "FontSize", there are no authored style rule for that property that apply since that property is not set at either the InterestingButton class or the Button class. Accordingly, conflict resolution rule #2 does not have influence over the resulting setting. Rather, conflict resolution #3 is determinative, and the inherited FontSize setting (FontSize=12 point) becomes the winning FontSize setting.

Have derived the winning style rules set, that derived style rules set may be displayed as follows.
WinningProperties
    Font: Times New Roman
    FontSize: 12 point Thus, in this first alternative walkthrough example, the following style rules may be displayed in the applied styles list when the InterestingButton element is selected:
InterestingButton
    Font=Times New Roman
Button
    Font=Arial
InheritedProperties
    Font: Helvetica
    FontSize: 12 point
WinningProperties
    Font: Times New Roman
    FontSize: 12 point Thus, in the first alternative, there are two authored styles rules (one for InterestingButton and one for Button) in the displayed authored style rule set, and two derived style rules (one for InheritedProperties and one for WinningProperties) in the displayed derived style rule set.

Once this hybrid group of style rules is displayed, the display can provide one or more of a number of different types of interactivity that is useful in the design process. In one example, a same set of interactivity functions are applied to each of the style rules, regardless of whether or not the style rule is an authored style rule or a derived style rule. For instance, by interacting on a particular style rule (e.g., a right click), the designer may be provided a list of possible functions to perform on that style rule. One example might be a copy function that allows the designer to copy the property name/value pair of the selected property name/value pair to a clipboard. Another function might be a paste function that allows the designer to paste a property name/value pair from a clipboard into the selected style rule (either supplementing the pair list for that style rule, or replacing a pair in the style rule depending on the gesture). Another function might be to clear the property so that the property value is cleared or set to an original value.

Alternatively or in addition, the interactivity may take advantage of binding between a property value of a name/value pair in a derived style rule with a property value of a name/value pair in an authored style rule. For instance, in one direction from the derived style rule to the authored style rule, the designer may edit value of the a property name/value pair in the derived style rule, where that property value is bound to a corresponding value of a property name/value pair in an authored style rule. The binding and the editing of the value will cause the corresponding value of the corresponding property name/value pair in the authored style rule to change also.

Likewise, in the other direction from the authored style rule to the derived style rule, the designer may edit the value of the property name/value pair in the authored style rule. The binding and the editing of the value will cause the corresponding value of the corresponding property name/value pair in the derived style rule to change also.

As an example, in the first alternative walkthough, the value of the Font property in the derived WinningProperties style rule may be bound to the value of the Font property in the authored InterestingButton style rule. If the designer did not like the current font of the selected element, rather than trying to figure out where the font value was set, the designer could instead change the value of the font property directly in the derived WinningProperties style rule (e.g., to Tacoma), and this would cause the font property in the authored InterestingButton style rule to change automatically to the new value (e.g., Tacoma). Likewise, if the designer were to change the value of the font property in the authored InterestingButton style rule (e.g., to Arial), this would cause the font property in the derived WinningProperties style rule to change automatically to the new value (e.g., Arial).

The second alternative of the walk through will now be described. In this second alternative, everything is the same as the first alternative walkthrough example, except for there are several properties that are set by executing script. The derivation component analyzes the script and determines that for the selected element, the font is set to Tacoma, and the font size is set to 10 point. The derivation component 210 would thus generate the following code style rules.
CodedProperties
    Font: Tacoma
    FontSize: 10 point This would likewise result in some change to the derived WinningProperties style rule as follows:
WinningProperties
    Font: Tacoma
    FontSize: 10 point This is because the conflict resolution rule #1 specifies that properties that are set by code always win oven any other conflicting property setting. Thus, the designer could be quickly apprised that unless the code is changed or removed, no other additional style rules would have influence over the font or font size of the selected element. This can prevent the designer from expending unnecessary efforts applying new style rules in a futile effort to change the font or font size of the selected element. It can also direct the designer to the proper way to effect a change, by changing or removing the code itself.

Thus, in this second alternative walkthrough example, the following style rules may be displayed in the applied styles list when the InterestingButton element is
InterestingButton
    Font=Times New Roman
Button
    Font=Arial
InheritedProperties
    Font: Helvetica
    FontSize: 12 point
WinningProperties
    Font: Tacoma
    FontSize: 10 point
CodedProperties
    Font: Tacoma
    FontSize: 10 point Accordingly, the principles described herein provide a powerful tool to create helpful derived style rules, and allow designers to be able to view not only authored style rules, but also the derived style rules as well. Furthermore, the designer may be permitted to interact with the style rules to effect powerful interaction between the authored and derived style rules to more intuitively design and style markup language documents.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more hardware computer processors, and
one or more computer storage media coupled to the one or more hardware computer processors and having thereon computer-executable instructions that are structured such that, when executed by one or more processors of the computer system, cause the computer system to perform the following:
evaluating an authored style rule set comprising one or more authored rules that are each defined to apply properties to markup language elements matching a markup language element type, to identify with respect to a markup language document having one or more markup language elements and markup language types, which of the defined properties affect how a specific markup language element of the markup language document is rendered when the authored rules are applied to the markup language document;
deriving a derived style rule set of one or more style rules by defining for each of the one or more style rules, one or more of the identified properties and a derived style rule category that corresponds to the identified properties, the derived style rule category comprises at least one of an inherited property style rule category, a winning property style category, a code style rules category, or a calculated style rule category;
displaying at least one of the authored style rules of the authored style rule set for the specific markup language element; and
displaying for the specific markup language element, at least one of the derived style rules of the derived style rule set with the at least one of the authored style rules of the authored style rule set, wherein displaying at least one of the derived style rules of the derived style rule set comprises displaying the derived style rule category with each derived style rule, and a description of how values associated with the properties of the derived style rules were derived from the one or more authored style rules.

2. The computer system in accordance with claim 1, wherein the derived style rule set is not interpretable, are ignored, or are not present to be interpreted by a browser.

3. The computer system in accordance with claim 2, wherein the authored style rule set is interpretable by the browser.

4. The computer system in accordance with claim 2, where the displaying is performed during editing of the markup language document that includes the markup language element type.

5. The computer system in accordance with claim 4, wherein the derived style rule set is invalidated prior to deploying the markup language document.

6. The computer system in accordance with claim 1, wherein the derived style rule set includes an inherited style rule set of one or more inherited style rules inherited by the markup language element type and wherein a derived style rule description is displayed identifying a derived style rule as one whose values are based on inherited values from one or more authored style rules.

7. The computer system in accordance with claim 1, wherein the derived style rule set includes a winning style rule set of one or more winning style rules that are each to be applied to the markup language element type after the application of style rule conflict resolution rules and wherein a derived style rule description is displayed identifying a derived style rule as one whose values are based on winning values from one or more authored style rules.

8. The computer system in accordance with claim 1, wherein the derived style rule set includes a code style rule set of one or more coded style rules that are set by executing code and wherein a derived style rule description is displayed identifying a derived style rule as one whose values are based on coded values from one or more authored style rules.

9. The computer system in accordance with claim 8, wherein the code is script.

10. The computer system in accordance with claim 1, wherein the derived style rule set includes an incompatible style rule set of one or more style rules that are incompatible with a particular product.

11. The computer system in accordance with claim 1, wherein the derived style rule set includes a calculated style rule set of one or more calculated style rules that have property values that are related to an authored style rule property value through a function.

12. The computer system in accordance with claim 1, wherein the computer-executable instructions are further structured such that, when executed by the one or more processors, the computer system is further configured to perform the following:
providing interactivity with the displayed style rules that include at least one of the authored style rules of the authored style rule set along with at least one of the derived style rules of the derived style rule set.

13. The computer system in accordance with claim 12, wherein the act of providing interactivity comprises:
providing a same set of style rule level interactivity functions to each of the displayed style rules.

14. The computer system in accordance with claim 13, wherein at least one of the style rule level interactivity functions includes a style rule copy function.

15. The computer system in accordance with claim 13, wherein at least one of the style rule level interactivity functions includes a style rule paste function.

16. The computer system in accordance with claim 13, wherein at least one of the style rule level interactivity functions includes a style rule clear function.

17. The computer system in accordance with claim 12, wherein a property of a displayed derived style rule is bound with a property of a displayed authored style rule, and where the act of providing interactivity comprises:
receiving user input, the user input selecting and editing the property of the displayed derived style rule to assign a value to the property of the displayed derived style rule; and
as a result, causing a value of the corresponding bound property of the displayed authored style rule to be assigned the same value of the property of the displayed derived style rule or a value that is derived from the value of the property of the displayed derived style rule.

18. The computer system in accordance with claim 12, wherein one of the properties of a displayed derived style rule is bound with one of the properties of a displayed authored style rule, and where the act of providing interactivity comprises:
receiving user input, the user input selecting and editing the property of the displayed authored style rule to assign a value to the property of the displayed authored style rule; and
as a result, causing a value of the corresponding bound property of the displayed derived style rule to be assigned the same value of the property of the displayed authored style rule or a value that is derived from the value of the property of the displayed authored style rule.

19. A computer-implemented method for displaying a hybrid set of one or more authored style rules as well as one or more derived style rules on a display, the method comprising:

executing computer-executable instructions on one or more hardware processors of a computing system, and in response thereto, the computing system performing the following:

evaluating an authored style rule set comprising one or more authored rules that are each defined to apply properties to markup language elements matching a markup language element type, to identify with respect to a markup language document having one or more markup language elements and markup language types, which of the defined properties affect how a specific markup language element of the markup language document is rendered when the authored rules are applied to the markup language document;

deriving a derived style rule set of one or more style rules by defining for each of the one or more style rules, one or more of the identified properties and a derived style rule category that corresponds to the identified properties, the derived style rule category comprises at least one of an inherited property style rule category, a winning property style category, a code style rules category, or a calculated style rule category; and concurrently displaying on a display of the computing system, for the specific markup language element, at least one of the authored style rules of the authored style rule set along with at least one of the derived style rules of the derived style rule set, wherein displaying at least one of the derived style rules of the derived style rule set comprises, for each derived style rule set, displaying the derived style rule category with each derived style rule, and a description of how values associated with the properties of the derived style rules of the derived style rule set were derived from the one or more authored style rules.

20. A computer system comprising:
one or more hardware processors;
one or more computer storage media coupled to the one or more hardware processors and having thereon computer-executable instructions that are structured such that, when executed by one or more processors of the computer system, cause the computer system to instantiate in memory the following:

a derivation component configured to 1) evaluate an authored style rule set comprising one or more authored rules that are each defined to apply properties to markup language elements matching a markup language element type, to identify with respect to a markup language document having one or more markup language elements and markup language types, which of the defined properties affect how a specific markup language element of the markup language document is rendered when the authored rules are applied to the markup language document, and 2) deriving a derived style rule set of one or more style rules by defining for each of the one or more style rules, one or more of the identified properties and a derived style rule category that corresponds to the identified properties, the derived style rule category comprises at least one of an inherited property style rule category, a winning property style category, a code style rules category, or a calculated style rule category; and a user interface component configured to 1) display, for the specific markup language element, at least one of the authored style rules of the authored style rule set along with at least one of the derived style rules of the derived style rule set, wherein displaying at least one of the derived style rules of the derived style rule set comprises, for each derived style rule set, displaying the derived style rule category with each derived style rule, and a description of how values associated with the properties of the derived style rules were derived from the one or more authored style rules, and 2) providing interactivity with the displayed style rules such that at least one of the properties of a derived style rule is bound to a property of an authored style rule from which the property of the derived style rule was derived.

* * * * *